US012795528B2

(12) United States Patent
Jung et al.

(10) Patent No.: US 12,795,528 B2
(45) Date of Patent: Nov. 10, 2026

(54) RESOURCE SELECTION FOR RANDOM ACCESS

(71) Applicant: LG ELECTRONICS INC., Seoul (KR)

(72) Inventors: Sunghoon Jung, Seoul (KR); Hyunjung Choe, Seoul (KR); Hanseul Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 362 days.

(21) Appl. No.: 18/561,066

(22) PCT Filed: May 31, 2022

(86) PCT No.: PCT/KR2022/007717
§ 371 (c)(1),
(2) Date: Nov. 15, 2023

(87) PCT Pub. No.: WO2022/255768
PCT Pub. Date: Dec. 8, 2022

(65) Prior Publication Data

US 2024/0267955 A1 Aug. 8, 2024

(30) Foreign Application Priority Data

May 31, 2021 (KR) ........................ 10-2021-0070211

(51) Int. Cl.

| | |
|---|---|
| ***H04W 48/18*** | (2009.01) |
| ***H04W 74/00*** | (2009.01) |
| ***H04W 74/0833*** | (2024.01) |
| *H04W 74/0836* | (2024.01) |
| *H04W 74/0838* | (2024.01) |

(52) U.S. Cl.
CPC ......... *H04W 48/18* (2013.01); *H04W 74/006* (2013.01); *H04W 74/0833* (2013.01); *H04W 74/0836* (2024.01); *H04W 74/0838* (2024.01)

(58) Field of Classification Search
None
See application file for complete search history.

(56) References Cited

U.S. PATENT DOCUMENTS

2024/0023168 A1* 1/2024 Gao ...................... H04W 48/18
2024/0064817 A1* 2/2024 Löhr ................... H04W 74/006

FOREIGN PATENT DOCUMENTS

KR 10-2019-0034316 4/2019

OTHER PUBLICATIONS

PCT International Application No. PCT/KR2022/007717, International Search Report dated Aug. 25, 2022, 4 pages.
Nokia et al., "RACH prioritisation for slices," R2-2103548, 3GPP TSG-RAN WG2 Meeting #113bis Electronic, Apr. 2021, 6 pages.

(Continued)

*Primary Examiner* — Anh Ngoc M Nguyen
(74) *Attorney, Agent, or Firm* — LEE, HONG, DEGERMAN, KANG & WAIMEY

(57) ABSTRACT

The present disclosure relates to a resource selection for a random access in wireless communications. According to various embodiments, a user equipment (UE) may select a random access channel (RACH) configuration for performing a random access to a cell for a slice group preferred by the UE, based on at least one of slice identifier information or slice priority information.

11 Claims, 15 Drawing Sheets

(56) References Cited

OTHER PUBLICATIONS

Nokia et al., "Slice-specific RACH prioritization," R2-2105475, 3GPP TSG-RAN WG2 Meeting #114 Electronic, May 2021, 6 pages.
Zte et al., "Slice specific RACH resources and RACH prioritization," R2-2104792, 3GPP TSG-RAN WG2 Meeting #114-e, Electronic, May 2021, 6 pages.
Qualcomm Incorporated, "Further discussion on slice specific RACH," R2-2104741, 3GPP TSG RAN WG2 Meeting #114-e, E-Conference, May 2021, 12 pages.
European Patent Office Application Serial No. 22816427.3, Search Report dated Sep. 3, 2024, 11 pages.
Oppo, "Consideration on slice-specific RACH," R2-2105569, 3GPP TSG-RAN WG2 #114-e, E-meeting, May 2021, 5 pages.
Xiaomi, "Considerations on slice based RACH configuration," R2-2104789, 3GPP TSG-RAN WG2 Meeting #114 electronic, Online, May 2021, 4 pages.

* cited by examiner

RESOURCE SELECTION FOR RANDOM ACCESS

CROSS-REFERENCE TO RELATED APPLICATIONS

This application is the National Stage filing under 35 U.S.C. 371 of International Application No. PCT/KR2022/007717, filed on May 31, 2022, which claims the benefit of earlier filing date and right of priority to Korean Application No. 10-2021-0070211, filed on May 31, 2021, the contents of which are all hereby incorporated by reference herein in their entireties.

TECHNICAL FIELD

The present disclosure relates to a resource selection for a random access in wireless communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In wireless communications, a user equipment (UE) may perform a random access to a cell to be uplink-synchronized with the cell. The UE may be provided with a random access channel (RACH) configuration from a network, and select a RACH resource within the RACH configuration. Then, the UE may perform a random access to a cell by using the selected RACH resource.

Further, there may be a plurality of slices which may provide a desired service to the UE. The UE may identify a slice which provides a desired service to the UE, and perform a random access to a cell for the identified slice.

SUMMARY

An aspect of the present disclosure is to provide method and apparatus for a resource selection for a random access in a wireless communication system.

Another aspect of the present disclosure is to provide method and apparatus for providing a random access configurations in a wireless communication system.

Another aspect of the present disclosure is to provide method and apparatus for selecting a random access configuration in a wireless communication system.

According to an embodiment of the present disclosure, a method performed by a user equipment (UE) in a wireless communication system comprises: receiving, from a network, a plurality of random access channel (RACH) configurations comprising: a first RACH configuration to which related one or more slice groups are identified by slice identifier information: a second RACH configuration related to one or more prioritized slice groups identified by slice priority information: and a third RACH configuration other than the first RACH configuration and the second RACH configuration: identifying a slice group preferred by the UE: selecting, among the plurality of RACH configurations, a RACH configuration related to the slice group based on at least one of the slice identifier information or the slice priority information: and performing a random access to a cell for the slice group based on the selected RACH configuration.

According to an embodiment of the present disclosure, a user equipment (UE) configured to operate in a wireless communication system comprises: at least one transceiver; at least processor: and at least one computer memory operably connectable to the at least one processor and storing instructions that, based on being executed by the at least one processor, perform operations comprising: receiving, from a network, a plurality of random access channel (RACH) configurations comprising: a first RACH configuration to which related one or more slice groups are identified by slice identifier information: a second RACH configuration related to one or more prioritized slice groups identified by slice priority information: and a third RACH configuration other than the first RACH configuration and the second RACH configuration: identifying a slice group preferred by the UE: selecting, among the plurality of RACH configurations, a RACH configuration related to the slice group based on at least one of the slice identifier information or the slice priority information: and performing a random access to a cell for the slice group based on the selected RACH configuration.

According to an embodiment of the present disclosure, at least one computer readable medium (CRM) stores instructions that, based on being executed by at least one processor, perform operations comprising: receiving, from a network, a plurality of random access channel (RACH) configurations comprising: a first RACH configuration to which related one or more slice groups are identified by slice identifier information: a second RACH configuration related to one or more prioritized slice groups identified by slice priority information: and a third RACH configuration other than the first RACH configuration and the second RACH configuration: identifying a slice group preferred by the UE: selecting, among the plurality of RACH configurations, a RACH configuration related to the slice group based on at least one of the slice identifier information or the slice priority information: and performing a random access to a cell for the slice group based on the selected RACH configuration.

According to an embodiment of the present disclosure, an apparatus for configured to operate in a wireless communication system comprises: at least processor: and at least one computer memory operably connectable to the at least one processor, wherein the at least one processor is configured to perform operations comprising: receiving, from a network, a plurality of random access channel (RACH) configurations comprising: a first RACH configuration to which related one or more slice groups are identified by slice identifier information: a second RACH configuration related to one or more prioritized slice groups identified by slice priority information: and a third RACH configuration other than the first RACH configuration and the second RACH configuration: identifying a slice group preferred by the UE: selecting, among the plurality of RACH configurations, a RACH configuration related to the slice group based on at least one of the slice identifier information or the slice priority information: and performing a random access to a cell for the slice group based on the selected RACH configuration.

According to an embodiment of the present disclosure, a method performed by a network node configured to operate in a wireless communication system comprises: transmitting, to a user equipment (UE), a configuration for a list of slice groups and a configuration for slice priority information: transmitting, to the UE, a plurality of RACH configurations comprising: a first RACH configuration to which related one or more slice groups are identified by slice identifier information: a second RACH configuration related to one or more prioritized slice groups identified by the slice priority information: and a third RACH configuration other than the first RACH configuration and the second RACH configuration: and performing a random access for the UE to access to a cell for a slice group preferred by the UE among the list of slice groups based on a RACH configuration related to the slice group. The RACH configuration related to the slice group is selected among the plurality of RACH configurations based on at least one of the slice identifier information or the slice priority information.

According to an embodiment of the present disclosure, a network node configured to operate in a wireless communication system comprises: at least one transceiver: at least processor: and at least one computer memory operably connectable to the at least one processor and storing instructions that, based on being executed by the at least one processor, perform operations comprising: transmitting, to a user equipment (UE), a configuration for a list of slice groups and a configuration for slice priority information: transmitting, to the UE, a plurality of RACH configurations comprising: a first RACH configuration to which related one or more slice groups are identified by slice identifier information: a second RACH configuration related to one or more prioritized slice groups identified by the slice priority information: and a third RACH configuration other than the first RACH configuration and the second RACH configuration: and performing a random access for the UE to access to a cell for a slice group preferred by the UE among the list of slice groups based on a RACH configuration related to the slice group. The RACH configuration related to the slice group is selected among the plurality of RACH configurations based on at least one of the slice identifier information or the slice priority information.

The present disclosure can have various advantageous effects.

For example, RACH configurations can be efficiently provided to UE when there are a plurality of slices which may provide a desired service to the UE.

For example, the UE can select a proper RACH configuration related to a slice preferred by the UE among RACH configurations and the UE can be provided with the RACH configurations with low signalling overhead.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
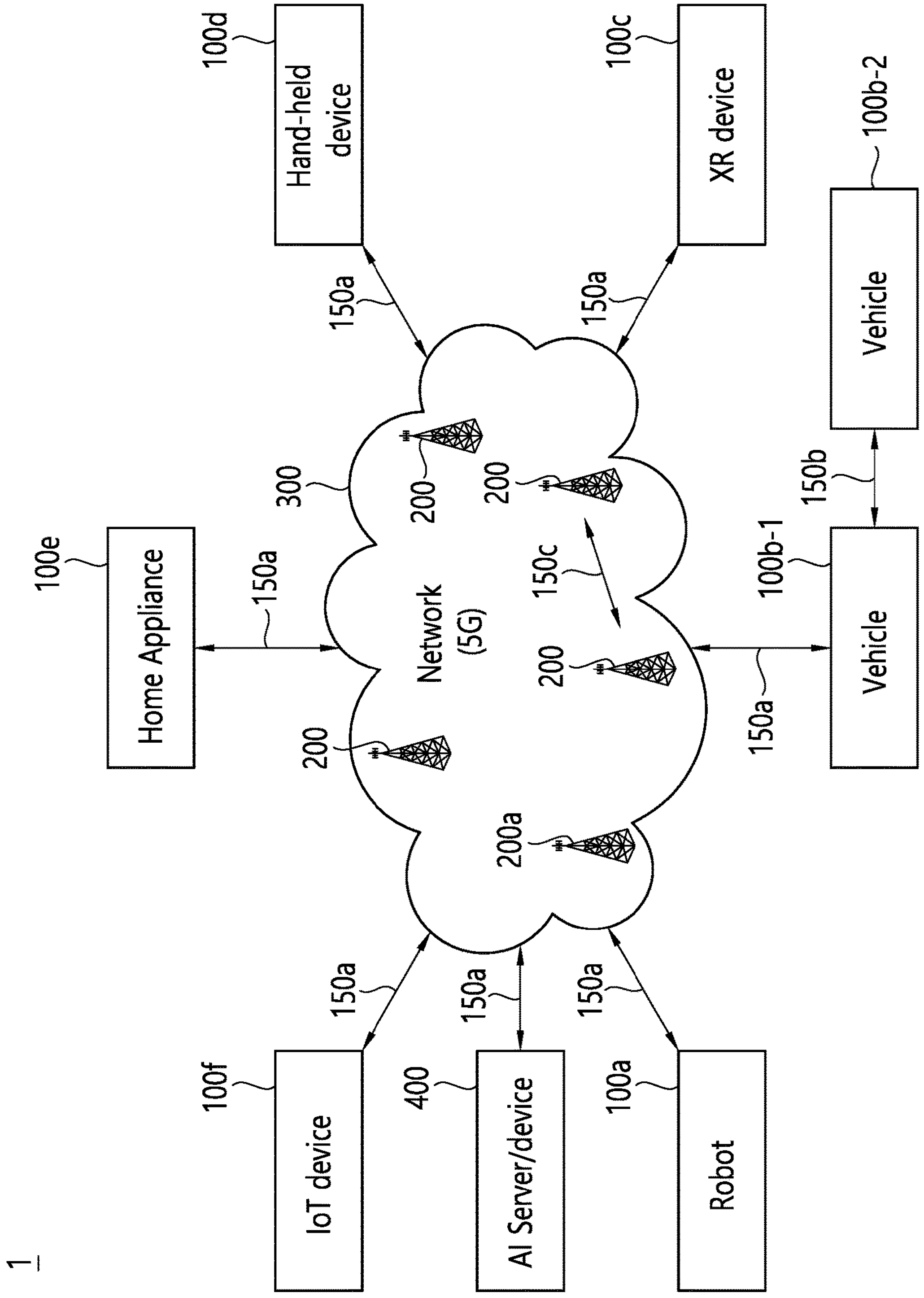
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality', 'signal strength', 'signal quality', 'channel state', 'channel quality', ' channel state/reference signal received power (RSRP)' and 'reference signal received quality (RSRQ)' may be used interchangeably.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB). (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100*a* to 100*f* may include, without being limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

Here, the radio communication technologies implemented in the wireless devices in the present disclosure may include narrow band internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Figure 2:
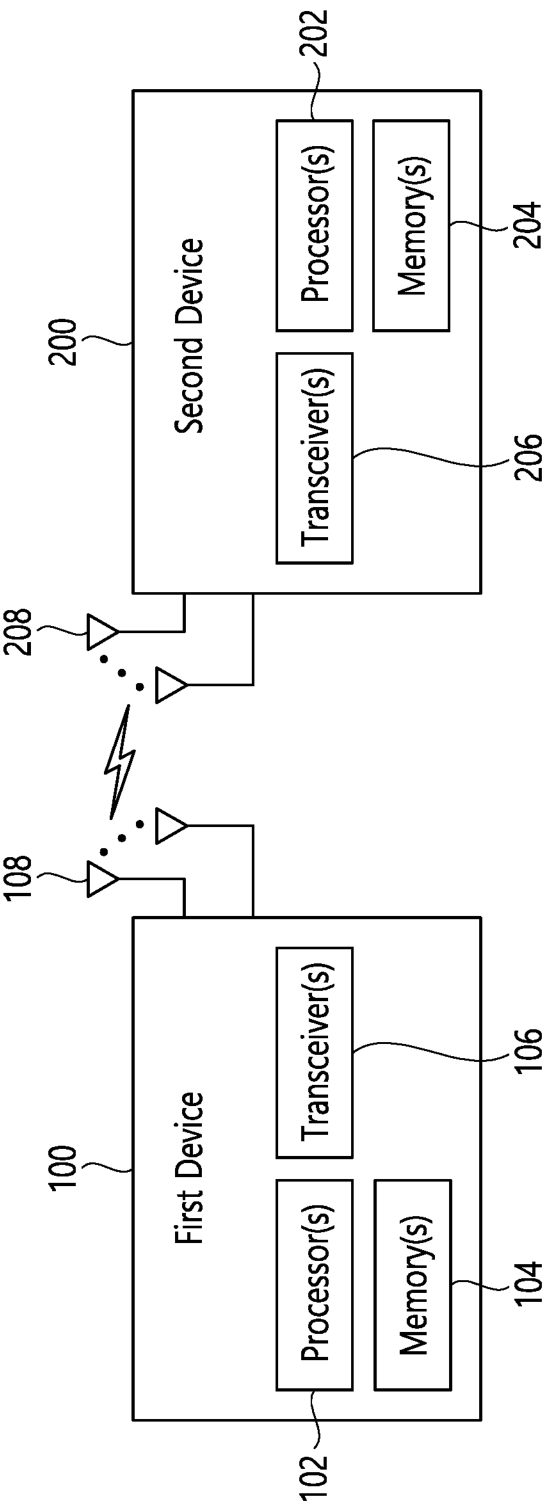
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100*a* to 100*f* and the BS

200}, {the wireless device 100*a* to 100*f* and the wireless device 100*a* to 100*f*} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory (s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202, descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
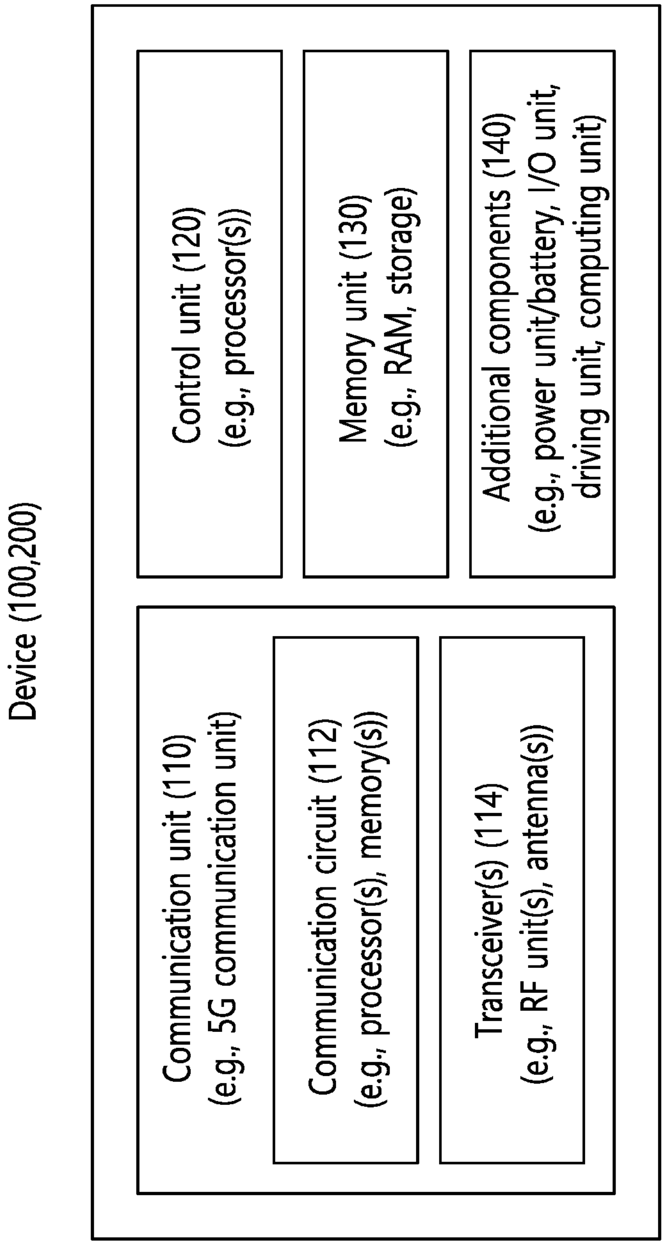
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
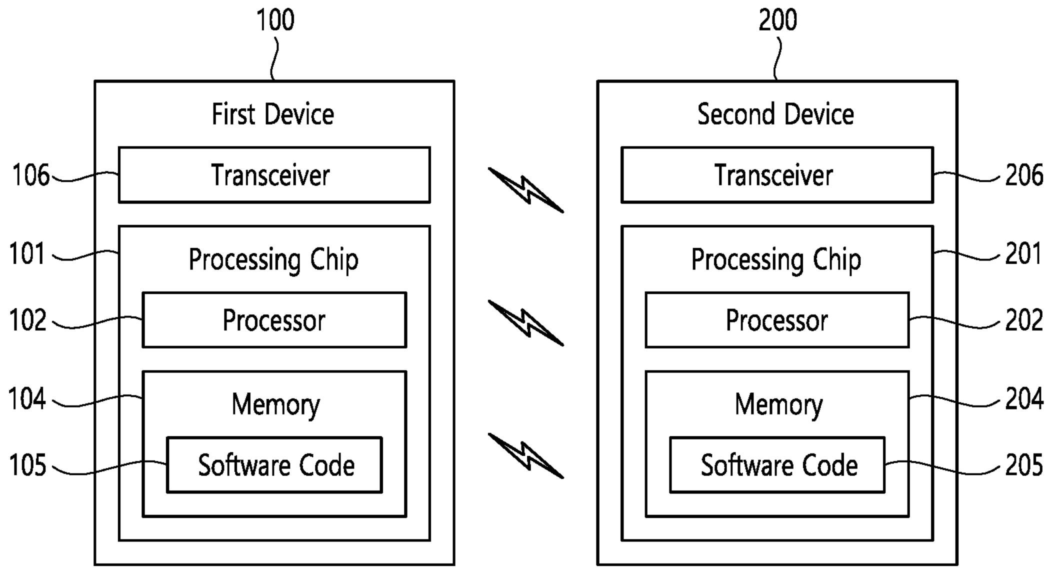
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
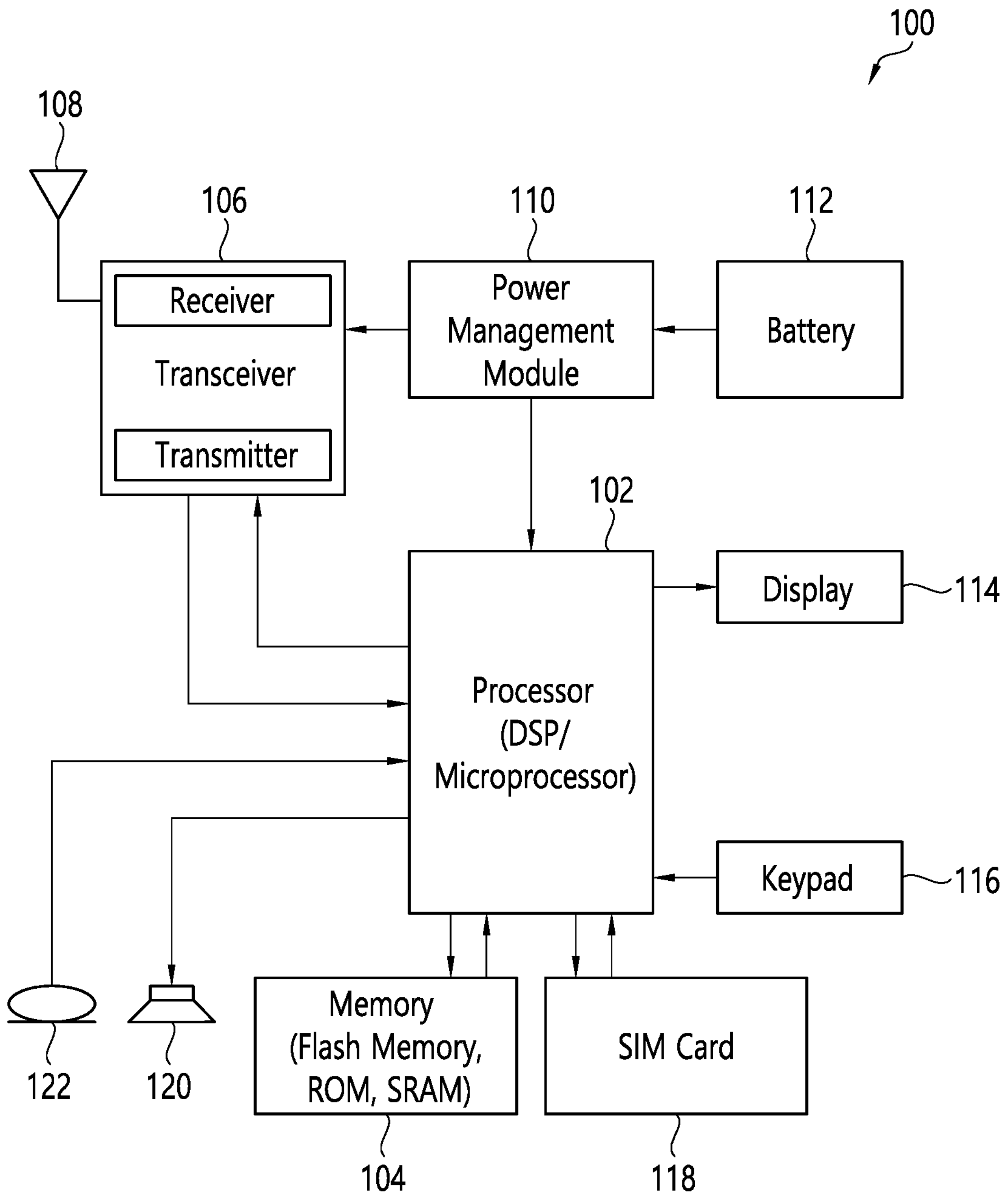
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
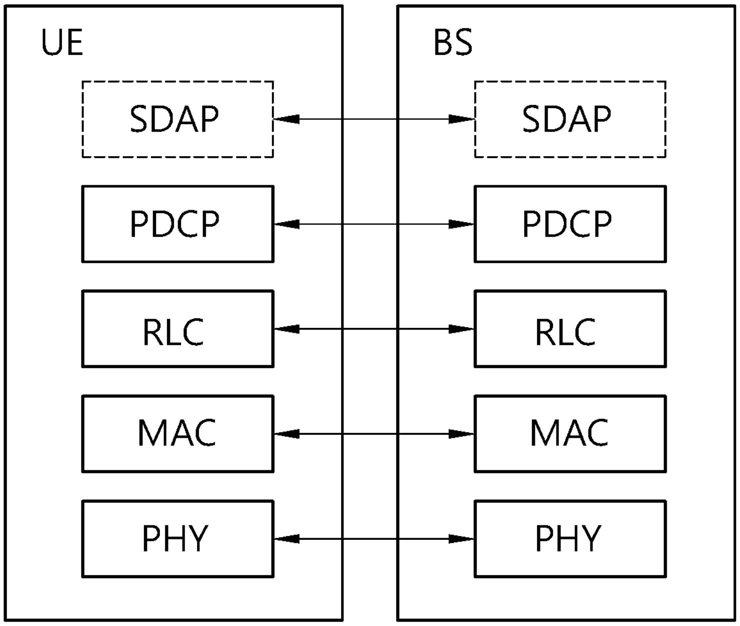
FIGS. 6 and 7 show an example of protocol stacks in a 3GPP based wireless communication system to which implementations of the present disclosure is applied.
Figure 7:
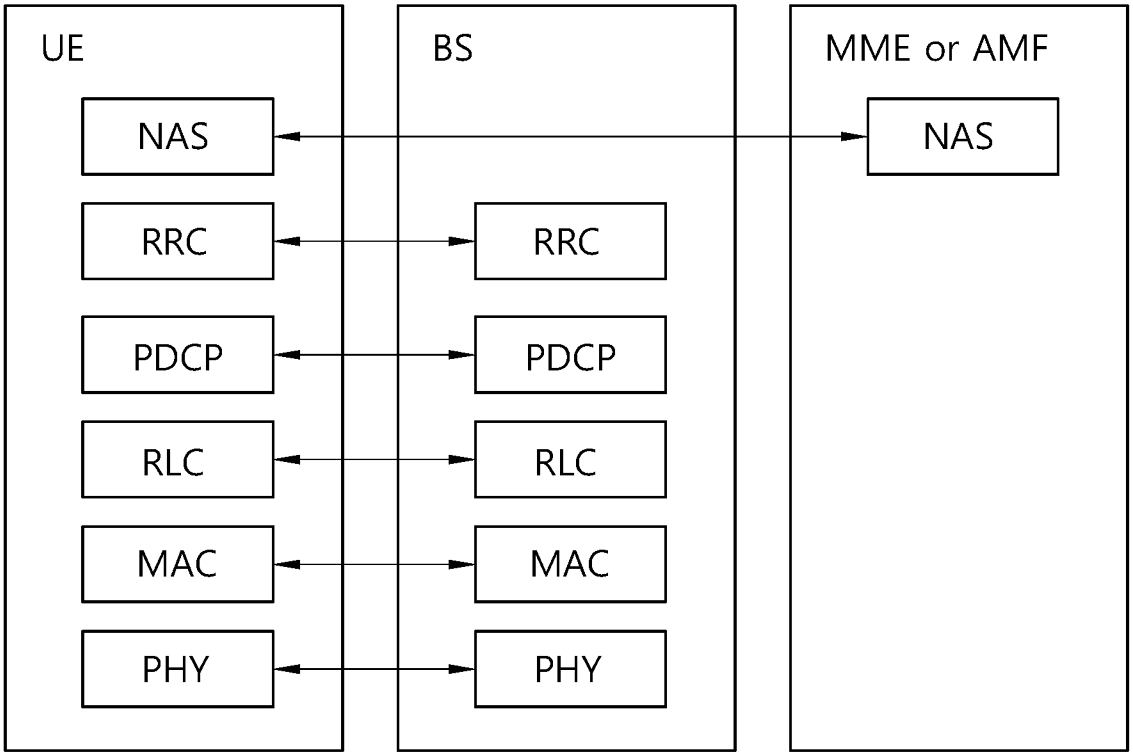

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QOS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling: priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment: protocol error detection (AM only).

In the 3GPP NR system, the main services and functions of the PDCP sublayer for the user plane include: sequence numbering: header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including; handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
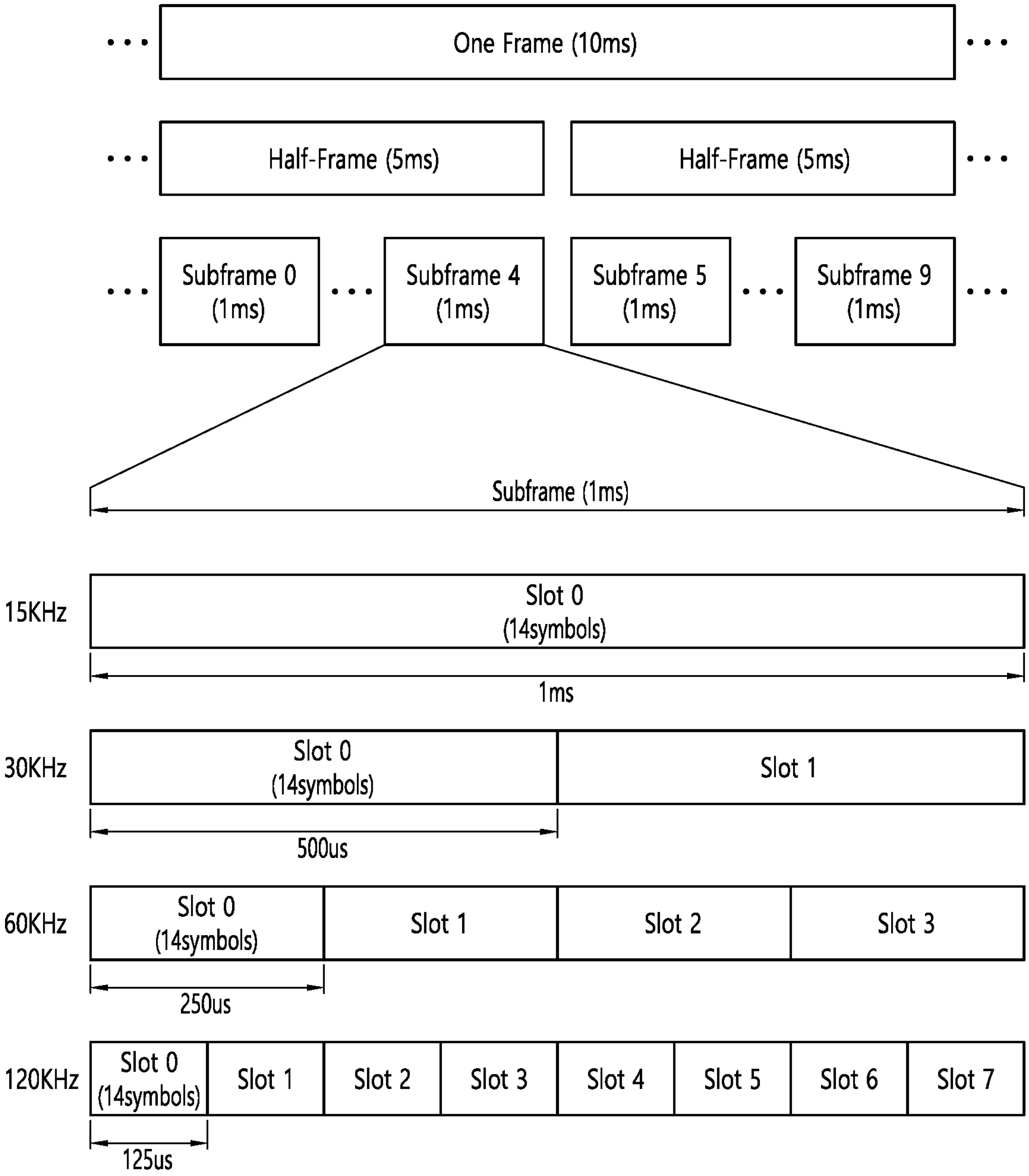
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\beta f=2^u*15$ KHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\beta f=2^u*15$ KHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\beta f=2^u*15$ KHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows; $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHZ (or 5850, 5900, 5925 MHZ, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times. In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE; one for the MCG and one for the SCG.

Figure 9:
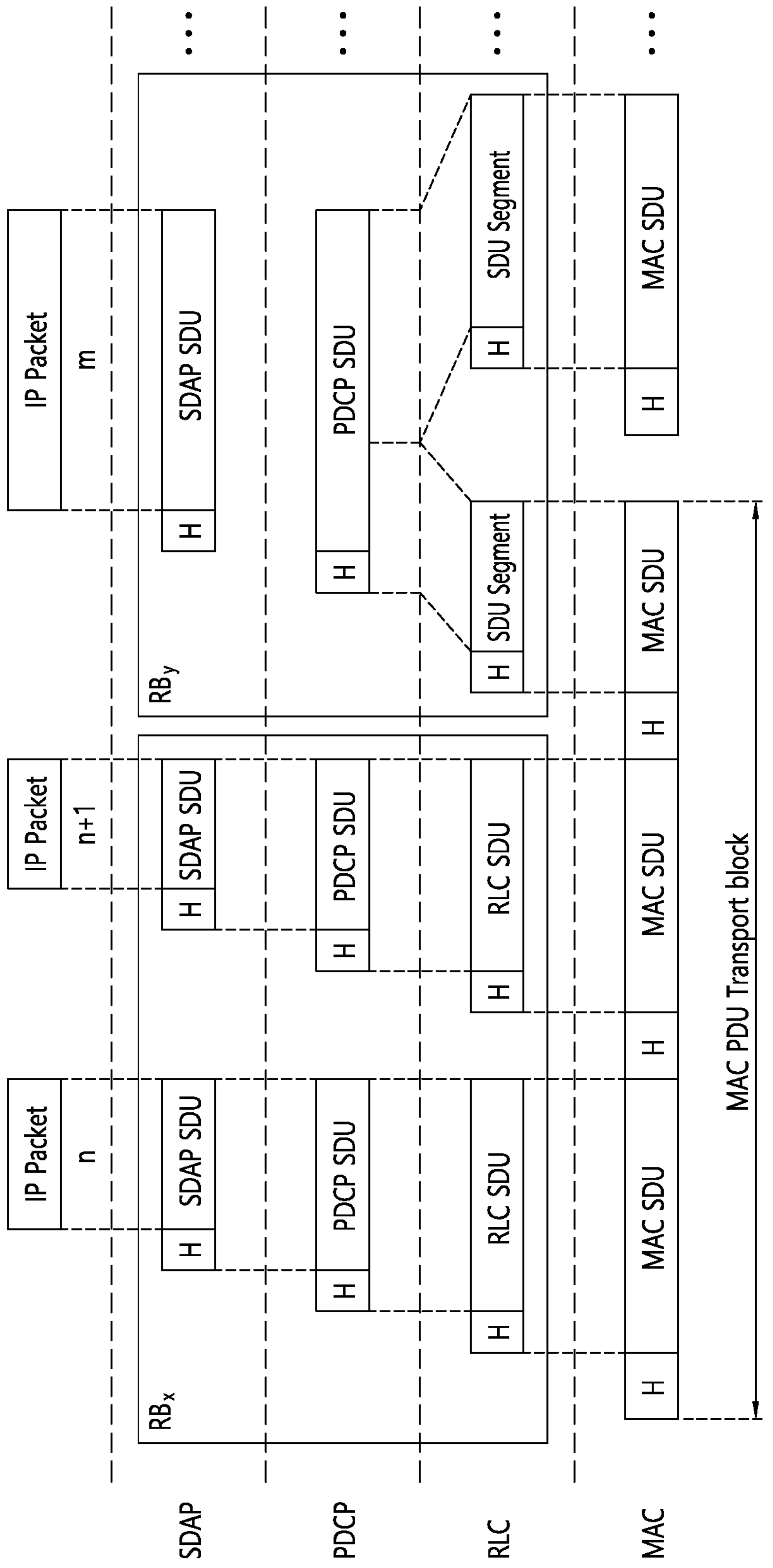
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9. "RB" denotes a radio bearer, and "H" denotes a header. Radio bearers are categorized into two groups; DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

Hereinafter, random access procedure is described.

Figure 10:
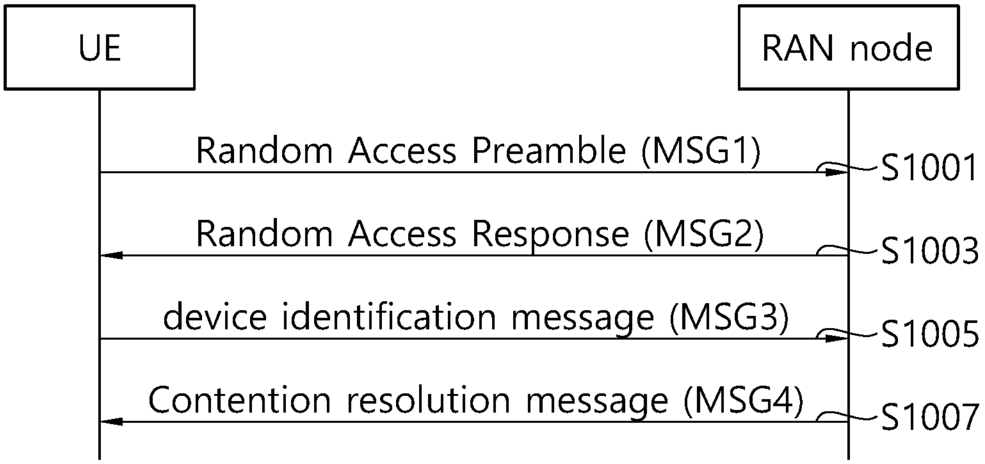
FIG. 10 shows an example of contention-based random access procedure to which technical features of the present disclosure can be applied.

FIG. 10 shows an example of contention-based random access procedure to which technical features of the present disclosure can be applied.

Referring to FIG. 10, in step S1001, The UE may transmit a random access preamble on RACH in uplink, to a RAN node. The UE may transmit a message 1 (MSG1) comprising the random access preamble. There are two possible groups defined and one is optional. If both groups are configured the size of message 3 and the pathloss are used to determine which group a preamble is selected from. The group to which a preamble belongs provides an indication of the size of the message 3 and the radio conditions at the UE. The preamble group information along with the necessary thresholds are broadcast on system information.

In step S1003, The UE may receive a random access response generated by MAC on downlink-shared channel (DL-SCH), from the RAN node. The UE may receive a message 2 (MSG2) comprising the random access response. The random access response may be Semi-synchronous (within a flexible window of which the size is one or more transit time interval (TTI)) with the msg1. The random access response message comprises at least one of a random access preamble identifier, timing alignment information for a primary timing advance group (pTAG), initial uplink (UL) grant and assignment of temporary C-RNTI.

In step S1005, the UE may transmit a device identification message to the RAN node.

The UE may transmit a message 3 (MSG3) comprising the device identification message. The device identification message may be a first scheduled UL transmission on UL-SCH. For initial access, the device identification message may comprise at least a NAS UE identifier. If the UE is in the RRC_CONNECTED state and has a C-RNTI, the device identification message may include the C-RNTI.

In step S1007, the UE may receive a contention resolution message from the RAN node. The UE may receive a message 4 (MSG4) comprising the contention resolution message. The contention resolution message may be addressed to the temporary C-RNTI on PDCCH for initial access and after radio link failure, or addressed to the C-RNTI on PDCCH for UE in RRC_CONNECTED state. The temporary C-RNTI is promoted to C-RNTI for a UE which detects RA success and does not already have a C-RNTI. A UE which detects RA success and already has a C-RNTI resumes using the C-RNTI.

Figure 11:
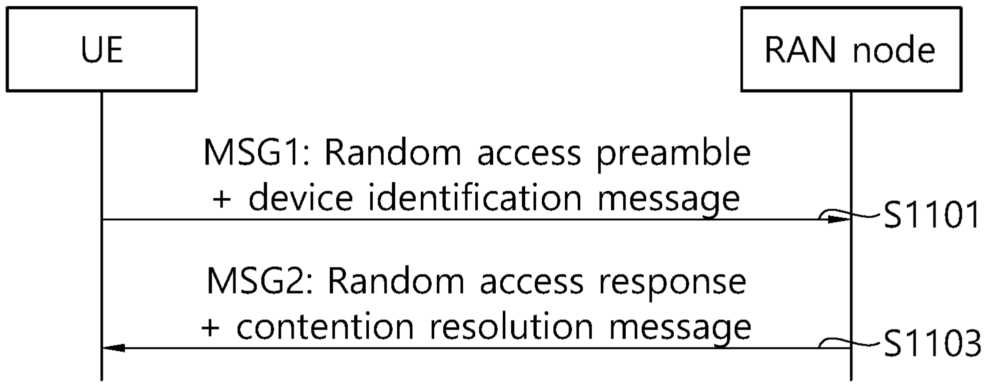
FIG. 11 shows an example of 2-step random access procedure to which technical features of the present disclosure can be applied.

FIG. 11 shows an example of 2-step random access procedure to which technical features of the present disclosure can be applied.

Referring to FIG. 11, in step S1101, a UE may transmit a random access preamble together with a device identification message to a RAN node. The UE may transmit a MSG1 (or, MSG A) comprising the random access preamble and the device identification message to the RAN node.

In step S1103, the UE may receive a random access response together with a contention resolution message from the RAN node. The UE may receive a MSG2 (or, MSG B) comprising the random access response and the contention resolution message from the RAN node.

UE may perform a random access using a RACH configuration. The RACH configuration may comprise a set of RACH resources. An example of RACH configuration is RACH-ConfigCommon used to specify the cell specific random-access parameters as shown in table 5 below:

TABLE 5

```
-- ASN1START
-- TAG-RACH-CONFIGCOMMON-START
RACH-ConfigCommon ::=                    SEQUENCE {
    rach-ConfigGeneric                       RACH-ConfigGeneric,
    totalNumberOfRA-Preambles                                 INTEGER (1..63)
OPTIONAL,    -- Need S
    ssb-perRACH-OccasionAndCB-PreamblesPerSSB    CHOICE {
        oneEighth                                         ENUMERATED
{n4,n8,n12,n16,n20,n24,n28,n32,n36,n40,n44,n48,n52,n56,n60,n64},
        oneFourth                                          ENUMERATED
{n4,n8,n12,n16,n20,n24,n28,n32,n36,n40,n44,n48,n52,n56,n60,n64},
        oneHalf                                            ENUMERATED
{n4,n8,n12,n16,n20,n24,n28,n32,n36,n40,n44,n48,n52,n56,n60,n64},
        one                                                ENUMERATED
{n4,n8,n12,n16,n20,n24,n28,n32,n36,n40,n44,n48,n52,n56,n60,n64},
        two                                                ENUMERATED
{n4,n8,n12,n16,n20,n24,n28,n32},
        four                                          INTEGER (1..16),
        eight                                         INTEGER (1..8),
        sixteen                                       INTEGER (1..4)
    }
OPTIONAL,    -- Need M
    groupBconfigured                        SEQUENCE {
        ra-Msg3SizeGroupA                          ENUMERATED {b56, b144,
b208, b256, b282, b480, b640,
                                                        b800,    b1000,
b72, spare6, spare5, spare4, spare3, spare2, spare1},
        messagePowerOffsetGroupB                        ENUMERATED
{ minusinfinity, dB0, dB5, dB8, dB10, dB12, dB15, dB18},
        numberOfRA-PreamblesGroupA                INTEGER (1..64)
    }
OPTIONAL,    -- Need R
    ra-ContentionResolutionTimer              ENUMERATED { sf8, sf16, sf24,
sf32, sf40, sf48, sf56, sf64},
    rsrp-ThresholdSSB                                            RSRP-Range
OPTIONAL,    -- Need R
    rsrp-ThresholdSSB-SUL                                        RSRP-Range
OPTIONAL,    -- Cond SUL
    prach-RootSequenceIndex                  CHOICE {
        l839                                     INTEGER (0..837),
        l139                                     INTEGER (0..137)
    },
    msg1-SubcarrierSpacing                                SubcarrierSpacing
OPTIONAL,    -- Cond L139
    restrictedSetConfig                   ENUMERATED {unrestrictedSet,
restrictedSetTypeA, restrictedSetTypeB},
    msg3-transformPrecoder                     ENUMERATED {enabled}
OPTIONAL,    -- Need R
    ...,
    [[
    ra-PrioritizationForAccessIdentity-r16    SEQUENCE {
        ra-Prioritization-r16                     RA-Prioritization,
        ra-PrioritizationForAI-r16                BIT STRING (SIZE (2))
    }
OPTIONAL,    -- Cond InitialBWP-Only
    prach-RootSequenceIndex-r16               CHOICE {
        l571                                      INTEGER (0..569),
        l1151                                     INTEGER (0..1149)
    }  OPTIONAL    -- Need R
    ]]
}
-- TAG-RACH-CONFIGCOMMON-STOP
-- ASN1STOP
```

In table 5:—messagePowerOffsetGroupB refers to a threshold for preamble selection;

msg1-SubcarrierSpacing refers to subcarrier spacing of physical random access channel (PRACH). Only the values 15 or 30 kHz (FR1), and 60 or 120 kHz (FR2) are applicable. If absent, the UE applies the SCS as derived from the prach-ConfigurationIndex in RACH-ConfigGeneric. The value also applies to contention free random access (RACH-ConfigDedicated), to SI-request and to contention-based beam failure recovery (CB-BFR). But it does not apply for contention free beam failure recovery (CF-BFR);

msg3-transformPrecoder may enable the transform precoder for Msg3 transmission. If the field is absent, the UE disables the transformer precoder;

numberOfRA-PreamblesGroupA refers to the number of CB preambles per SSB in group A. This determines implicitly the number of CB preambles per SSB available in group B. The setting should be consistent with the setting of ssb-perRACH-OccasionAndCB-PreamblesPerSSB;

prach-RootSequenceIndex refers to PRACH root sequence index. The value range depends on whether L=839 or L=139 or L=571 or L=1151. The length of the root sequence corresponding with the index indicated in this IE should be consistent with the one indicated in prach-ConfigurationIndex in the RACH-ConfigDedicated (if configured). If prach-RootSequenceIndex-r16 is signalled, UE shall ignore the prach-RootSequenceIndex (without suffix);

ra-ContentionResolutionTimer refers to the initial value for the contention resolution timer;

ra-Msg3SizeGroupA refers to transport Blocks size threshold in bits below which the UE shall use a contention-based RA preamble of group A;

ra-Prioritization refers to parameters which apply for prioritized random access procedure on any UL BWP of SpCell for specific Access Identities;

ra-PrioritizationFor AI indicates whether the field ra-Prioritization-r16 applies for Access Identities. The first/leftmost bit corresponds to Access Identity 1, the next bit corresponds to Access Identity 2. Value 1 indicates that the field ra-Prioritization-r16 applies otherwise the field does not apply;

rach-ConfigGeneric refers to RACH parameters for both regular random access and beam failure recovery;

associated with 8 RACH occasions, value oneFourth corresponds to one SSB associated with 4 RACH occasions, and so on. Value n4 corresponds to 4 Contention Based preambles per SSB, value n8 corresponds to 8 Contention Based preambles per SSB, and so on. The total number of CB preambles in a RACH occasion is given by CB-preambles-per-SSB*max(1, SSB-per-rach-occasion); and totalNumberOfRA-Preambles refers to the total number of preambles used for contention based and contention free 4-step or 2-step random access in the RACH resources defined in RACH-ConfigCommon, excluding preambles used for other purposes (e.g. for SI request). If the field is absent, all 64 preambles are available for RA. The setting should be consistent with the setting of ssb-per RACH-OccasionAndCB-PreamblesPerSSB, i.e. it should be a multiple of the number of SSBs per RACH occasion.

The RACH-ConfigGeneric may be used to specify the random-access parameters both for regular random access as well as for beam failure recovery. Table 6 shows information elements (Ies) of the RACH-ConfigGeneric;

TABLE 6

```
-- ASN1START
-- TAG-RACH-CONFIGGENERIC-START
RACH-ConfigGeneric ::=                    SEQUENCE {
      prach-ConfigurationIndex              INTEGER (0..255),
      msg1-FDM                                  ENUMERATED {one, two, four,
eight},
      msg1-Frequency Start                                          INTEGER
(0..maxNrofPhysicalResourceBlocks-1),
      zeroCorrelationZoneConfig             INTEGER(0..15),
      preambleReceivedTargetPower            INTEGER (-202..-60),
      preambleTransMax                          ENUMERATED {n3, n4, n5, n6,
n7, n8, n10, n20, n50, n100, n200},
      powerRampingStep                          ENUMERATED {dB0, dB2, dB4,
dB6},
      ra-ResponseWindow                         ENUMERATED {sl1, sl2, sl4, sl8,
sl10, sl20, sl40, sl80},
      ...,
      [[
      prach-ConfigurationPeriodScaling-IAB-r16                  ENUMERATED
{scf1,scf2,scf4,scf8,scf16,scf32,scf64}              OPTIONAL,      -- Need R
      prach-ConfigurationFrameOffset-IAB-r16                    INTEGER (0..63)
OPTIONAL,    -- Need R
      prach-ConfigurationSOffset-IAB-r16                        INTEGER (0..39)
OPTIONAL,    -- Need R
      ra-ResponseWindow-v1610                              ENUMERATED { sl60,
sl160}                                                 OPTIONAL, -- Need R
      prach-ConfigurationIndex-v1610                        INTEGER (256..262)
OPTIONAL -- Need R
      ]]
  }
-- TAG-RACH-CONFIGGENERIC-STOP
-- ASN1STOP
```

restrictedSetConfig refers to a configuration of an unrestricted set or one of two types of restricted sets;

rsrp-ThresholdSSB is a threshold such that UE may select the SS block and corresponding PRACH resource for path-loss estimation and (re)transmission based on SS blocks that satisfy the threshold;

rsrp-ThresholdSSB-SUL is a threshold such that the UE selects SUL carrier to perform random access based on the threshold. The value applies to all the BWPs;

ssb-perRACH-OccasionAndCB-PreamblesPerSSB refers to the information about the number of SSBs per RACH occasion by CHOICE field and the number of Contention Based preambles per SSB by ENUMERATED field. Value oneEighth corresponds to one SSB In table 6:—msg1-FDM refers to the number of PRACH transmission occasions FDMed in one time instance;

msg1-FrequencyStart refers to offset of lowest PRACH transmission occasion in frequency domain with respective to PRB 0. The value is configured so that the corresponding RACH resource is entirely within the bandwidth of the UL BWP;

power RampingStep refers to power ramping steps for PRACH;

prach-ConfigurationFrameOffset-IAB refers to frame offset for ROs defined in the baseline configuration indicated by prach-ConfigurationIndex and is used only by the IAB-MT;

prach-ConfigurationIndex refers to PRACH configuration index. For prach-ConfigurationIndex configured under beamFailureRecovery-Config, the prach-ConfigurationIndex can only correspond to the short preamble format. If the field prach-ConfigurationIndex-v1610 is present, the UE shall ignore the value provided in prach-ConfigurationIndex (without suffix);

prach-ConfigurationPeriodScaling-LAB refers to scaling factor to extend the periodicity of the baseline configuration indicated by prach-ConfigurationIndex and is used only by the IAB-MT. Value scf1 corresponds to scaling factor of 1 and so on;

prach-ConfigurationSOffset-IAB refers to subframe/slot offset for ROs defined in the baseline configuration indicated by prach-ConfigurationIndex and is used only by the IAB-MT;

preambleReceivedTargetPower refers to the target power level at the network receiver side. Only multiples of 2 dBm may be chosen (e.g. −202, −200, −198, . . . );

preambleTransMax refers to the maximum number of RA preamble transmissions performed before declaring a failure;

ra-ResponseWindow refers to Msg2 (RAR) window length in number of slots. The network configures a value lower than or equal to 10 ms when Msg2 is transmitted in licensed spectrum and a value lower than or equal to 40 ms when Msg2 is transmitted with shared spectrum channel access. UE ignores the field if included in SCellConfig. If ra-ResponseWindow-v1610 is signalled, UE shall ignore the ra-Response Window (without suffix); and zeroCorrelationZoneConfig refers to N-CS configuration.

The RA-Prioritization may be used to configure prioritized random access. IEs of the RA-Prioritization are described in table 7 below;

TABLE 7

```
-- ASN1START
-- TAG-RA-PRIORITIZATION-START
RA-Prioritization ::=                SEQUENCE {
  powerRampingStepHighPriority         ENUMERATED {dB0, dB2, dB4, dB6},
  scalingFactorBI                        ENUMERATED {zero, dot25, dot5,
dot75}                                OPTIONAL,   -- Need R
  ...
}
-- TAG-RA-PRIORITIZATION-STOP
-- ASN1STOP
```

In table 7, power RampingStepHighPrioritiy refers to power ramping step applied for prioritized random access procedure. Hereinafter, network slicing is described.

Network slicing enables the operator to create networks customized to provide optimized solutions for different market scenarios which demands diverse requirements, e.g. in the areas of functionality, performance and isolation. A network slice is composed of all the network functions (NFs) that are required to provide the required telecommunication services and network capabilities, and the resources to run these NFs.

NF refers to processing functions in a network. This includes but is not limited to telecom nodes functionality, as well as switching functions e.g. Ethernet switching function, IP routing functions. That is, NF has defined functional behavior and interfaces. An NF can be implemented either as a network element on a dedicated hardware, or as a software instance running on a dedicated hardware, or as a virtualized function instantiated on an appropriate platform, e.g, on a cloud infrastructure. Virtual NF (VNF) is a virtualized version of a NF.

Network slicing concept consists of 3 layers; 1) service instance layer, 2) network slice instance layer, and 3) resource layer.

The service instance layer represents the services (end-user service or business services) which are to be supported. Each service is represented by a service instance. The service instance is an instance of an end-user service or a business service that is realized within or by a network slice. Typically services can be provided by the network operator or by 3rd parties. In line with this, a service instance can either represent an operator service or a 3rd party provided service.

A network operator uses a network slice blueprint to create a network slice instance. A network slice instance provides the network characteristics which are required by a service instance. A network slice instance is a set of NFs, and resources to run these NFs, forming a complete instantiated logical network to meet certain network characteristics required by the service instance(s);

A network slice instance may be fully or partly, logically and/or physically, isolated from another network slice instance.

The resources comprises of physical and logical resources.

A network slice instance may be composed of sub-network instances, which as a special case may be shared by multiple network slice instances. The network slice instance is defined by a network slice blueprint.

Instance-specific policies and configurations are required when creating a network slice instance.

Network characteristics examples are ultra-low-latency, ultra-reliability etc.

A network slice instance may also be shared across multiple service instances provided by the network operator.

A network slice blueprint is a complete description of the structure, configuration and the plans/work flows for how to instantiate and control the network slice instance during its life cycle. A network slice blueprint enables the instantiation of a network slice, which provides certain network characteristics (e.g, ultra-low latency, ultra-reliability, value-added services for enterprises, etc.). A network slice blueprint refers to required physical and logical resources and/or to sub-network blueprint(s).

The network slice instance may be composed by none, one or more sub-network instances, which may be shared by another network slice instance. Similarly, the sub-network blueprint is used to create a sub-network instance to form a set of NFs, which run on the physical/logical resources. A sub-network instance comprises of a set of NFs and the resources for these NFs;

- The sub-network instance is defined by a sub-network blueprint.
- A sub-network instance is not required to form a complete logical network.
- A sub-network instance may be shared by two or more network slices.
- The resources comprises of physical and logical resources.

The sub-network blueprint is a description of the structure (and contained components) and configuration of the sub-network instances and the plans/work flows for how to instantiate it. A sub-network blueprint refers to physical and logical resources and may refer to other sub-network blueprints.

Physical resource is a physical asset for computation, storage or transport including radio access. NFs are not regarded as resources.

Logical resource is partition of a physical resource, or grouping of multiple physical resources dedicated to a NF or shared between a set of NFs.

As one solution for network slicing, to enable a UE to simultaneously obtain services from multiple network slices of one network operator, a single set of C-Plane functions that are in common among core network instances is shared across multiple core network instances. Further, other C-Plane functions that are not in common reside in their respective core network instances, and are not shared with other core network instances.

Figure 12:
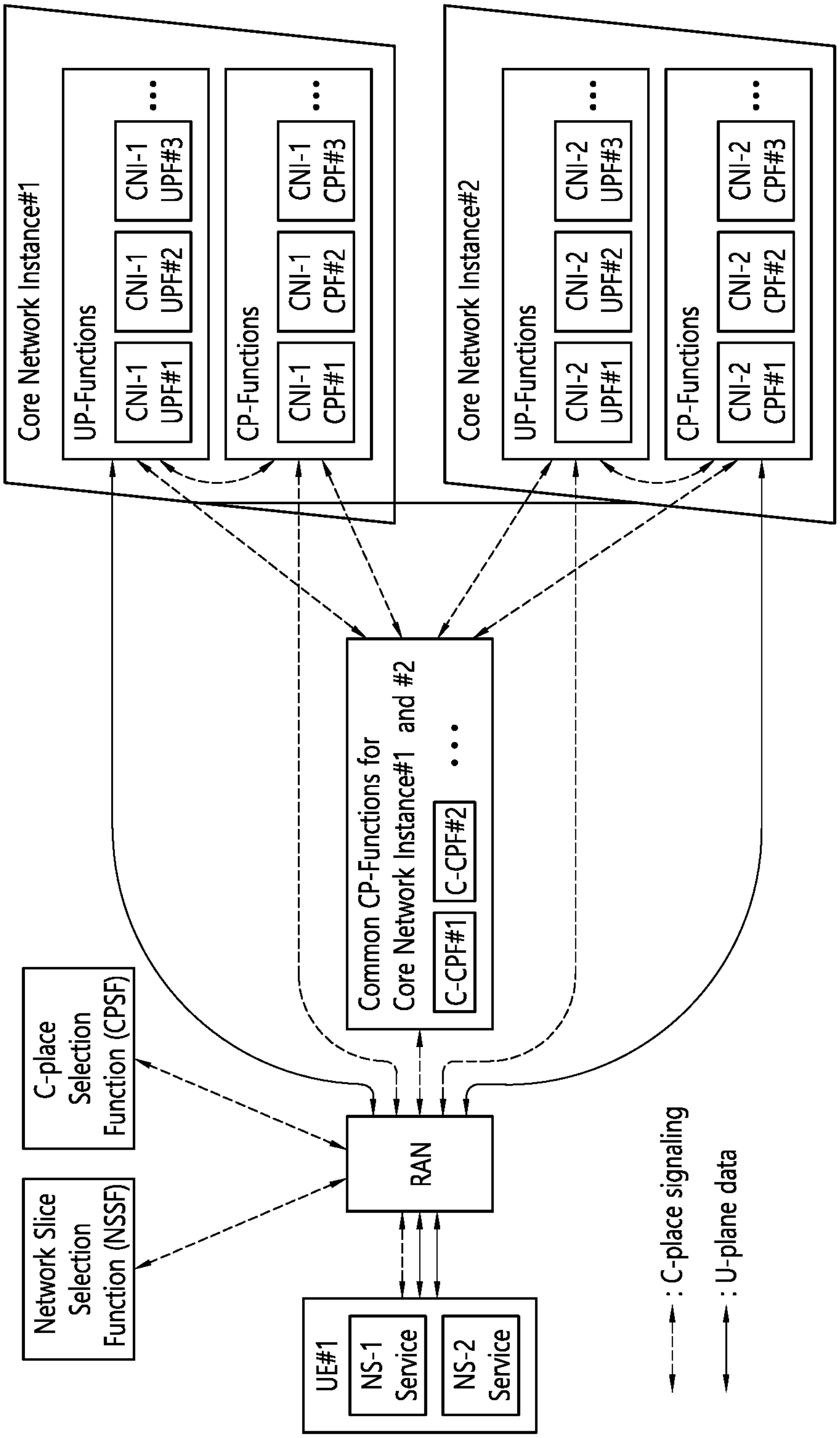
FIG. 12 shows an example of sharing a set of common C-plane functions among multiples core network instances.

FIG. 12 shows an example of sharing a set of common C-plane functions among multiples core network instances. The principles of the solution shown in FIG. 12 are as follows;

- A core network instance (i.e., network slice) consists of a single set of C-Plane functions and a single set of U-Plane functions.
- A core network instance is dedicated for the UEs that are belonging to the same UE type. Identifying the UE type is done by using a specific parameter, e.g, the UE usage type, and/or an information from the UE's subscription.
- A set of C-Plane functions is responsible, for example, for supporting UE mobility if demanded or for admitting the UE into the network by performing authentication and subscription verification.
- All C-Plane functions that are common to multiple core network instances, are not necessary to be created multiple times.
- Other C-Plane functions that are not in common with other core network instances are only used by its own core network instance.
- A set of U-Plane functions in a core network instance is responsible for providing a specific service to the UE and for transports the U-Plane data of the specific service. For example, one set of U-Plane functions in core network instance #1 provides an enhanced mobile broadband service to the UE, whereas another set of U-Plane functions in core network instance #2 provides a critical communication service to the UE.
- Each UE can have multiple U-Plane connections to different sets of U-Plane function that are available at different core network instances simultaneously.
- The network slice selection function (NSSF) is responsible for selecting which core network instance to accommodate the UE by taking into account the UE's subscription and the specific parameter, e.g, the UE usage type.
- The C-Plane selection function (CPSF) is responsible for selecting which C-Plane functions within the selected core network instance that the base station should communicate with. This selection of C-Plane functions is done by using the specific parameter, e.g. UE usage type.

Meanwhile, for slice-aware random access, UE may be configured with RACH resources/configurations (e.g., RACH-ConfigCommon) that can be only used for access for a list of slices or slice groups. Each slice group may comprise one or more slices. The main purpose of slice-aware random access is to accelerate access for a certain group of slices. To enable slice-aware random access, some RACH resources/configurations can be associated with a list of slices or groups. Broadcasting of the association between RACH resources/configurations and the list of slices or slice groups may be needed to allow UE to use the optimal RACH resources/configuration for RRC connection establishment or RRC connection resume.

For concerned RACH resources/configurations, several slices or slice groups can be associated with the RACH resources/configurations. In this case, the required signalling size to express the association fully may be significant. Since capacity of system information message is restricted, the increased signalling overhead may prevent the association information from being contained in one essential SI message (e.g. SIB1). In this case, network may need to signal the RACH resources/configurations with the association information across multiple SI messages. Then UE may need to acquire those SI messages (e.g., SIB1 including some RACH configurations/resources and possibly association information, and other new SIB including remaining association information and possibly RACH configurations/resources) to identify the proper RACH resources/configurations before performing random access (RA). Since it takes some time for UE to acquire each SI, acquisition of multiple SI messages would delay random access, yielding that fast access via slice-aware RA fails.

Moreover, partitioning of RACH resources into more/smaller RACH resource subgroups may result in degradation of random access using the subgroup RACH resources, if the RACH resource subgroups are not properly provisioned. For example, the amount of RACH resources are too small compared to the demand of the RACH resources (i.e., the concerned RACH subgroup resources are insufficient) so that there may be higher collisions of random access (i.e., same RACH resource is used by multiple UEs at the same time).

To overcome the aforementioned issues, a specific RACH resource set (or equivalently RACH configuration set) can be used by a certain group of slices under a specific condition.

Figure 13:
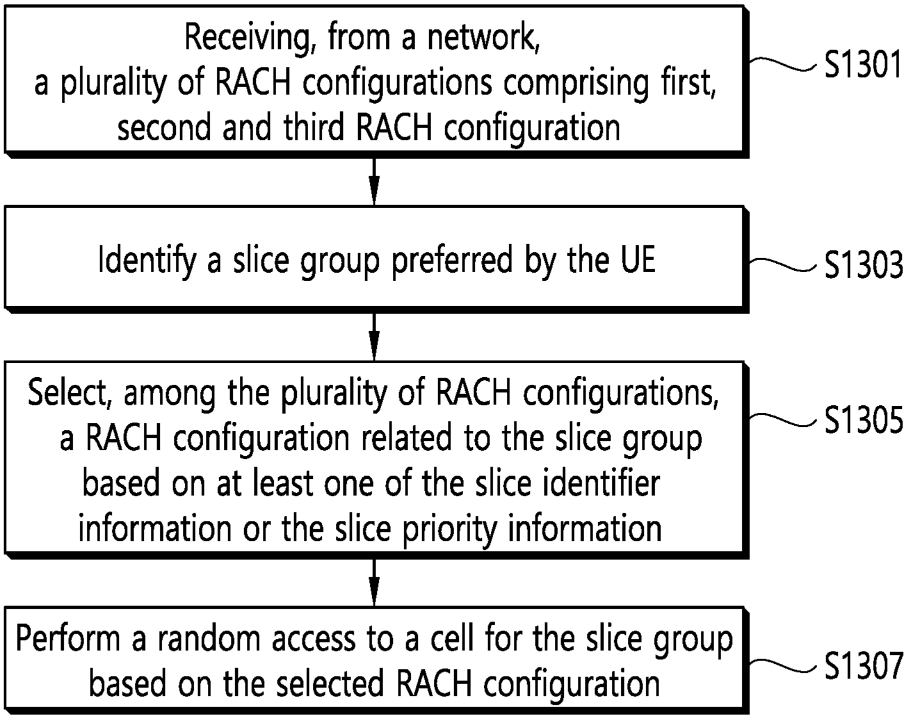
FIG. 13 shows an example of a method performed by a UE according to an embodiment of the present disclosure.

FIG. 13 shows an example of a method performed by a UE according to an embodiment of the present disclosure. The method may also be performed by a wireless device.

Referring to FIG. 13, in step S1301, the UE may receive, from a network, a plurality of RACH configurations comprising: first, second and third RACH configuration.

The first RACH configuration may be a RACH configuration to which related one or more slice groups are identified by slice identifier information. That is, one or more slice groups related to the first RACH configuration may be informed by the slice identifier information.

The second RACH configuration may be a RACH configuration related to one or more prioritized slice groups identified by slice priority information. That is, the second RACH configuration may be related to one or more prioritized slice groups identified by the slice priority information.

The third RACH configuration may be a RACH configuration other than the first RACH configuration and the second RACH configuration.

In step S1303, the UE may identify a slice group preferred by the UE. For example, a slice associated with a service the UE intends to get may be called the slice preferred by the UE.

In step S1305, the UE may select, among the plurality of RACH configurations, a RACH configuration related to the slice group based on at least one of the slice identifier information or the slice priority information.

In step S1307, the UE may perform a random access to a cell for the slice group based on the selected RACH configuration.

According to various embodiments, the first RACH configuration may comprise the slice identifier information. The slice identifier information may comprise one or more slice identifiers each of which is related to a corresponding slice among the one or more slice groups related to the first RACH configuration.

According to various embodiments, the second RACH configuration may comprise an indication that the second RACH configuration is reserved for the one or more prioritized slice groups.

According to various embodiments, the UE may receive, from the network, a configuration for the slice priority information.

According to various embodiments, the slice priority information may comprises a prioritization threshold. Each of the one or more prioritized slice groups may be configured with a slice priority higher than the prioritization threshold.

According to various embodiments, the slice priority information may comprise an explicit indication indicating the one or more prioritized slice groups.

According to various embodiments, the UE may receive, from the network, a configuration for a list of slice groups. The slice preferred by the UE may be identified among the list of slice groups.

According to various embodiments, the configuration for the list of slice groups may comprise at least one of: one or more slice identifiers each of which is related to a corresponding slice in the list; or one or more slice priorities each of which is related to a corresponding slice in the list.

According to various embodiments, the slice preferred by the UE may comprise a slice associated with a service the UE intends to be provided with.

According to various embodiments, the UE may select the first RACH configuration as the RACH configuration related to the slice based on that a slice identifier of the slice is included in the slice identifier information.

According to various embodiments, the UE may select the second RACH configuration as the RACH configuration related to the slice based on that a slice identifier of the slice is not included in the slice identifier information, and the slice is included in the one or more prioritized slice groups. For example, if a slice identifier of the slice is not included in the slice identifier information, the UE may determine whether the slice is included in the one or more prioritized slice groups based on the slice priority information. If the slice is configured with a slice priority higher than a prioritization threshold in the slice priority information, the UE may determine that the slice is included in the one or more prioritized slice groups. If the slice is indicated by the explicit indication in the slice priority information as being a prioritized slice, the UE may determine that the slice is included in the one or more prioritized slice groups.

According to various embodiments, the UE may select the third RACH configuration as the RACH configuration related to the slice based on that a slice identifier of the slice is not included in the slice identifier information, and the slice is not included in the one or more prioritized slice groups.

According to various embodiments, the UE may attempt to access a cell for an intended slice. The UE may receive a first RACH configuration, a second RACH configuration and a third configuration. The first RACH configuration may be associated with at least one slice. The second RACH configuration may be associated with high priority slice. The third RACH configuration may not be associated with a slice. The UE may select a RACH configuration based on conditions. A first condition is to select the first RACH configuration if the cell provides the first RACH configuration, and if the first RACH configuration is associated with the intended slice. A second condition is to select the second RACH configuration if the first condition is not met, and if the cell provides the second RACH configuration, and if the intended slice is configured as high-priority slice. A third condition is to select the third RACH configuration if the first and the second conditions are not met, and if the cell provides the third RACH configuration. The UE may perform a random access to the cell using the selected RACH configuration.

Furthermore, the method in perspective of the UE described above in FIG. 13 may be performed by first wireless device 100 shown in FIG. 2, the wireless device 100 shown in FIG. 3, the first wireless device 100 shown in FIG. 4 and/or the UE 100 shown in FIG. 5.

More specifically, the UE comprises at least one transceiver, at least processor, and at least one computer memory operably connectable to the at least one processor and storing instructions that, based on being executed by the at least one processor, perform operations.

The operations comprise; receiving, from a network, a plurality of random access channel (RACH) configurations comprising: a first RACH configuration, a second RACH configuration and a third RACH configuration; identifying a slice group preferred by the UE; selecting, among the plurality of RACH configurations, a RACH configuration related to the slice group based on at least one of the slice identifier information or the slice priority information; and performing a random access to a cell for the slice group based on the selected RACH configuration. The first RACH configuration may be a RACH configuration to which related one or more slice groups are identified by slice identifier information. The second RACH configuration may be a RACH configuration related to one or more prioritized slice groups identified by slice priority information. The third RACH configuration may be a RACH configuration other than the first RACH configuration and the second RACH configuration.

Furthermore, the method in perspective of the UE described above in FIG. 13 may be performed by a software code 105 stored in the memory 104 included in the first wireless device 100 shown in FIG. 4.

More specifically, at least one computer readable medium (CRM) stores instructions that, based on being executed by at least one processor, perform operations comprising: receiving, from a network, a plurality of random access channel (RACH) configurations comprising: a first RACH configuration, a second RACH configuration and a third RACH configuration; identifying a slice group preferred by the UE; selecting, among the plurality of RACH configurations, a RACH configuration related to the slice group based on at least one of the slice identifier information or the slice priority information; and performing a random access to a cell for the slice group based on the selected RACH configuration. The first RACH configuration may be a RACH configuration to which related one or more slice groups are identified by slice identifier information. The second RACH configuration may be a RACH configuration related to one or more prioritized slice groups identified by slice priority information. The third RACH configuration may be a RACH configuration other than the first RACH configuration and the second RACH configuration.

Furthermore, the method in perspective of the UE described above in FIG. 13 may be performed by control of the processor 102 included in the first wireless device 100 shown in FIG. 2, by control of the communication unit 110 and/or the control unit 120 included in the wireless device 100 shown in FIG. 3, by control of the processor 102 included in the first wireless device 100 shown in FIG. 4 and/or by control of the processor 102 included in the UE 100 shown in FIG. 5.

More specifically, an apparatus configured to operate in a wireless communication system (e.g., wireless device/UE) comprises at least processor, and at least one computer memory operably connectable to the at least one processor. The at least one processor is configured to perform operations comprising: receiving, from a network, a plurality of random access channel (RACH) configurations comprising: a first RACH configuration, a second RACH configuration and a third RACH configuration; identifying a slice group preferred by the UE; selecting, among the plurality of RACH configurations, a RACH configuration related to the slice group based on at least one of the slice identifier information or the slice priority information; and performing a random access to a cell for the slice group based on the selected RACH configuration. The first RACH configuration may be a RACH configuration to which related one or more slice groups are identified by slice identifier information. The second RACH configuration may be a RACH configuration related to one or more prioritized slice groups identified by slice priority information. The third RACH configuration may be a RACH configuration other than the first RACH configuration and the second RACH configuration.

Figure 14:
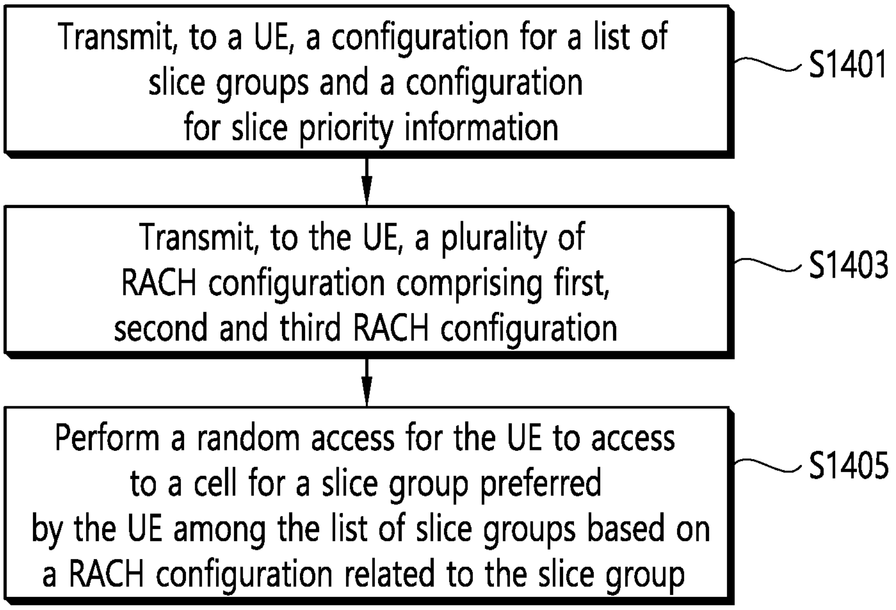
FIG. 14 shows an example of a method performed by a network node according to an embodiment of the present disclosure.

FIG. 14 shows an example of a method performed by a network node according to an embodiment of the present disclosure. For example, the network node may comprise a base station (BS).

Referring to FIG. 14, in step S1401, the network node may transmit, to a UE, a configuration for a list of slice groups and a configuration for slice priority information.

In step S1403, the network node may transmit, to the UE, a plurality of RACH configurations comprising first, second and third RACH configuration.

The first RACH configuration may be a RACH configuration to which related one or more slice groups are identified by slice identifier information. That is, one or more slice groups related to the first RACH configuration may be informed by the slice identifier information.

The second RACH configuration may be a RACH configuration related to one or more prioritized slice groups identified by slice priority information. That is, the second RACH configuration may be related to one or more prioritized slice groups identified by the slice priority information.

The third RACH configuration may be a RACH configuration other than the first RACH configuration and the second RACH configuration.

In step S1405, the network node may perform a random access for the UE to access to a cell for a slice group preferred by the UE among the list of slice groups based on a RACH configuration related to the slice group. The RACH configuration related to the slice group may be selected among the plurality of RACH configurations based on at least one of the slice identifier information or the slice priority information.

Furthermore, the method in perspective of the network node described above may be performed by second wireless device 100 shown in FIG. 2, the device 100 shown in FIG. 3, and/or the second wireless device 200 shown in FIG. 4.

More specifically, the network node comprises at least one transceiver, at least processor, and at least one computer memory operably connectable to the at least one processor and storing instructions that, based on being executed by the at least one processor, perform operations.

The operations comprise; transmitting, to a UE, a configuration for a list of slice groups and a configuration for slice priority information; transmitting, to the UE, a plurality of RACH configurations comprising first, second and third RACH configuration; and performing a random access for the UE to access to a cell for a slice group preferred by the UE among the list of slice groups based on a RACH configuration related to the slice group. The first RACH configuration may be a RACH configuration to which related one or more slice groups are identified by slice identifier information. The second RACH configuration may be a RACH configuration related to one or more prioritized slice groups identified by slice priority information. The third RACH configuration may be a RACH configuration other than the first RACH configuration and the second RACH configuration. The RACH configuration related to the slice group may be selected among the plurality of RACH configurations based on at least one of the slice identifier information or the slice priority information.

Figure 15:
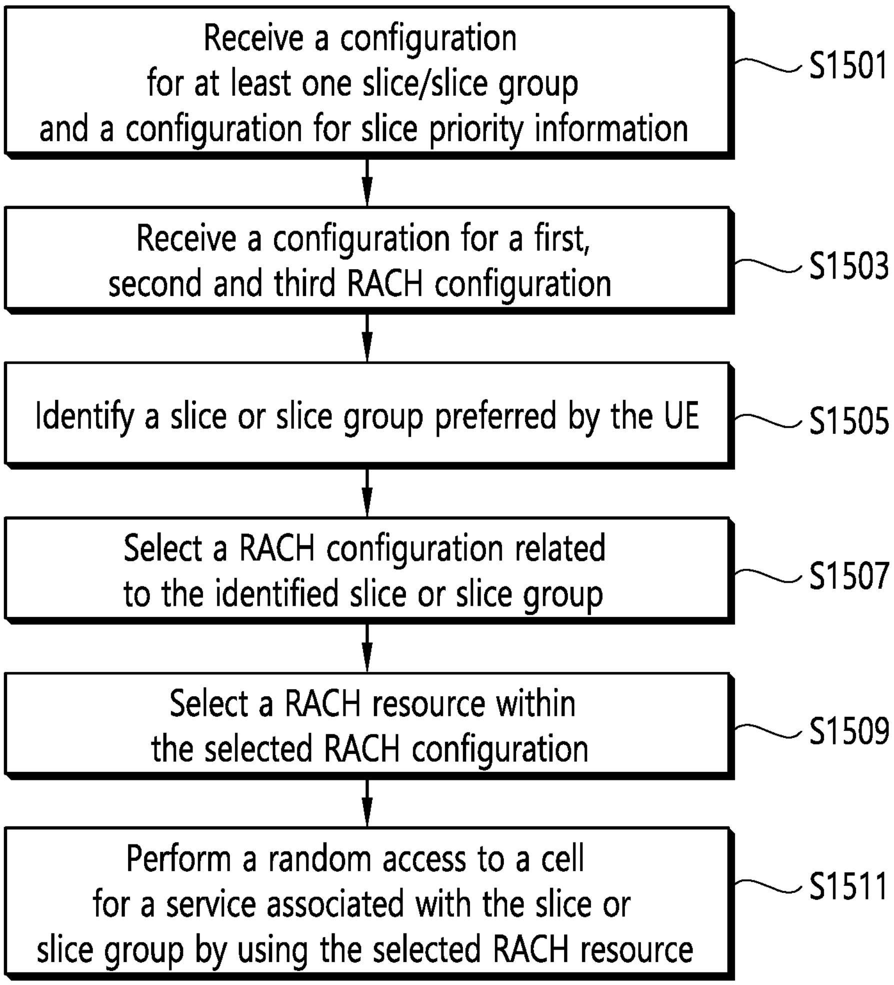
FIG. 15 shows an example of a method for RACH configuration selection for a preferred slice according to an embodiment of the present disclosure.

FIG. 15 shows an example of a method for RACH configuration selection for a preferred slice according to an embodiment of the present disclosure. The method may be performed by a UE and/or wireless device.

Referring to FIG. 15, in step S1501, the UE may receive a configuration for at least one slice/slice group and a configuration for slice priority information (or, high priority slice information). The high priority slice information may identify which slice or slice group has high priority. The configurations can be signalled via NAS or AS.

Each slice or slice group may be configured with a certain slice priority, and a slice with a slice priority value exceeding a threshold may be considered as a slice with high priority.

Each slice or slice group may be configured with an explicit indication indicating that this slice or slice group has high priority.

In step S1503, the UE may receive a configuration for a first, second and third RACH configuration. UE may be configured with a first RACH resource set (or equivalently RACH configuration set), and a second RACH resource set (or equivalently RACH configuration set), and a third RACH resource set (or equivalently RACH configuration set).

The first RACH resource set may be associated with at least one slice or slice group. For the first RACH resource set, the associated slices or slice groups are indicated by slice identifier information. The slice identifier information may comprise one or more slice identifiers each of which is related to a corresponding slice among the slices or slice groups associated with the first RACH resource set.

The second RACH resource set may be associated with high priority slice identified by the high priority slice information. For the second RACH resource set, no slice identifier or slice group identifies are indicated. For the second RACH resource set, information to indicate that this resource is reserved for high priority slice can be indicated such that UE can distinguish the second RACH resource set from the first RACH resource set and/or the third RACH resource set.

The third RACH resource set may not be associated with a slice or slice group or high priority slice. The third RACH resource set may be legacy RACH resource set Each RACH resource set or RACH configuration set may contain at least one of the followings;

- Information indicating RACH preamble IDs allowed for the concerned resource set;
- Information indicating the number of SSBs per RACH occasion;
- Information indicating the number of contention based RACH preambles per SSB;
- Information indicating the number of contention based RACH preambles per RACH occasion;
- Information indicating the number of RACH preambles for contention based and contention free random access procedure;
- Information that is used for preamble selection, e.g, message power offset Group B;
- Contention resolution timer;
- Information used for random access prioritization, e.g, power ramping step, scaling factor for the backoff indicator; or
- RSRP threshold related to PRACH resource selection, where UE may select SS block and corresponding PRACH resources for path-loss estimation and transmission based on SS block that satisfy the threshold.

In step S1505, the UE may identify a slice or slice group preferred by the UE. The slice or slice group associated with a service the UE intends to get can be called desired (or intended/preferred) slice or slice group.

In step S1507, the UE may select a RACH configuration related to the identified slice or slice group. UE may select a RACH resource set (or equivalently RACH configuration set).

For selection of RACH resource set (or equivalently RACH configuration set), UE may firstly check if the cell provides the first RACH resource set associated with the desired slice or slice group. Then, the UE may;

1> If such RACH resource set is provided in the cell;

2> select the RACH resource set (or equivalently the RACH configuration set), which is the first RACH resource set (or equivalently the first RACH configuration set);

1> If such RACH resource set (or equivalently such RACH configuration set) is not provided in the cell;

2> If the desired slice is high priority access, and if the cell provides the second resource set (or equivalently the second RACH configuration set), 3> select the second RACH resource set (or equivalently the second RACH configuration set);

2> If the desired slice is not high priority access, or if the cell does not provide the second resource set (or equivalently the second RACH configuration set), 3> select the third RACH resource set (or equivalently the third RACH configuration set).

In step S1509, the UE may select a RACH resource within the selected RACH configuration. If the RACH resource set (or equivalently RACH configuration set) is selected, the UE may select a RACH resource to be used for random access within the selected RACH resource set (or equivalently UE applies parameters as provided in the selected RACH configuration).

As a result of selecting RACH resource within the selected RACH resource set, the UE may choose a random access preamble (PRACH), e.g., for 4-step RA.

As a result of selecting RACH resource within the selected RACH resource set, the UE may choose a random access preamble coupled with PUSCH, e.g., msgA resources for 2-step RA.

As a result of selecting RACH configuration set, the UE may select parameters in accordance with the selected RACH resource set.

In step S1511, the UE may perform a random access to a cell for a service associated with the slice or slice group by using the selected RACH resource (or equivalently by applying the selected RACH configuration).

The present disclosure can have various advantageous effects.

For example, RACH configurations can be efficiently provided to UE when there are a plurality of slices which may provide a desired service to the UE.

For example, the UE can select a proper RACH configuration related to a slice preferred by the UE among RACH configurations and the UE can be provided with the RACH configurations with low signalling overhead.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising:

receiving, by a user equipment (UE), a plurality of access configurations from a network, wherein the plurality of access configurations comprises:

i) a first access configuration related to one or more slice groups identified by slice identifier information, ii) a second access configuration related to one or more prioritized slice groups identified by slice priority information, and iii) a third access configuration not related to any slice group;

identifying, by the UE, a slice group preferred by the UE;

based on i) the slice group not being included in the one or more slice groups identified by the slice identifier information and ii) the slice group being included in the one or more prioritized slice groups identified by the slice priority information, selecting, by the UE, the second access configuration among the plurality of access configurations for the slice group; and performing, by the UE, a random access to a cell for the slice group based on the second access configuration.

2. The method of claim 1, wherein the first access configuration comprises the slice identifier information, and wherein the slice identifier information comprises one or more slice identifiers each of which is related to a corresponding slice among the one or more slice groups related to the first access configuration.

3. The method of claim 1, wherein the second access configuration comprises an indication indicating that the second access configuration is reserved for the one or more prioritized slice groups.

4. The method of claim 1, further comprising:

receiving, from the network, a configuration for the slice priority information.

5. The method of claim 1, wherein the slice priority information comprises a prioritization threshold, and wherein each of the one or more prioritized slice groups is configured with a slice priority higher than the prioritization threshold.

6. The method of claim 1, wherein the slice priority information comprises an explicit indication indicating the one or more prioritized slice groups.

7. The method of claim 1, further comprising:

receiving, from the network, a configuration for a list of slice groups, wherein the slice group preferred by the UE is identified among the list of slice groups.

8. The method of claim 7, wherein the configuration for the list of slice groups comprises at least one of:

one or more slice identifiers each of which is related to a corresponding slice in the list; or one or more slice priorities each of which is related to a corresponding slice in the list.

9. The method of claim 1, wherein the slice group preferred by the UE comprises a slice group associated with a service the UE intends to be provided with.

10. The method of claim 1, wherein each of the plurality of access configurations comprises at least one of:

a set of preambles;

a number of synchronization signal/physical broadcast channel (SS/PBCH) blocks (SSB) per random access channel (RACH) occasion;

a number of preambles per SSB;

a number of preambles per RACH occasion;

a contention resolution timer;

a power ramping step;

a scaling factor for a backoff indicator; or a reference signal received power (RSRP) threshold related to physical RACH (PRACH) resource selection.

11. A user equipment (UE) comprising:

at least one transceiver;

at least one processor; and at least one computer memory operably connectable to the at least one processor and storing instructions that, based on being executed by the at least one processor, cause the UE to perform operations comprising:

receiving a plurality of access configurations from a network, the plurality of access configurations comprises:

i) a first access configuration related to one or more slice groups identified by slice identifier information;

ii) a second access configuration related to one or more prioritized slice groups identified by slice priority information, and iii) a third access configuration not related to any slice group;

identifying a slice group preferred by the UE;

based on i) the slice group not being included in the one or more slice groups identified by the slice identifier information and ii) the slice group being included in the one or more prioritized slice groups identified by the slice priority information, selecting, the second access configuration among the plurality of access configurations for the slice group; and performing a random access to a cell for the slice group based on the second access configuration.

* * * * *